(12) United States Patent
Vishwanath et al.

(10) Patent No.: US 7,233,806 B2
(45) Date of Patent: Jun. 19, 2007

(54) APPARATUS AND METHOD EMPLOYING TIME-MULTIPLEXED SEARCHER FINGER MONITORING FOR ACTIVE SET AND OTHER BASE STATIONS

(75) Inventors: T.G. Vishwanath, San Diego, CA (US); Jean-Marie Tran, San Diego, CA (US)

(73) Assignee: Nokia Corporation, Espoo (FI)

( * ) Notice: Subject to any disclaimer, the term of this patent is extended or adjusted under 35 U.S.C. 154(b) by 516 days.

(21) Appl. No.: 10/676,343

(22) Filed: Sep. 30, 2003

(65) Prior Publication Data

US 2005/0070267 A1    Mar. 31, 2005

(51) Int. Cl.
*H04B 7/00* (2006.01)
*H04B 7/02* (2006.01)
*H04B 1/00* (2006.01)
*H04J 3/08* (2006.01)

(52) U.S. Cl. .............. 455/525; 455/101; 455/524; 370/326; 375/148

(58) Field of Classification Search ............ 455/150.1, 455/226.1, 525, 101; 375/347, 130, 148; 370/335, 331, 326
See application file for complete search history.

(56) References Cited

U.S. PATENT DOCUMENTS

| | | | | |
|---|---|---|---|---|
| 5,920,549 A | * | 7/1999 | Bruckert et al. | 370/331 |
| 6,128,330 A | | 10/2000 | Schilling | 375/141 |
| 6,160,799 A | * | 12/2000 | Krause et al. | 370/335 |
| 6,269,075 B1 | | 7/2001 | Tran | 370/206 |
| 6,408,039 B1 | * | 6/2002 | Ito | 375/347 |
| 6,539,006 B1 | * | 3/2003 | Taylor | 370/335 |
| 6,570,909 B1 | | 5/2003 | Kansakoski et al. | 375/148 |
| 6,904,080 B1 | * | 6/2005 | Hokao | 375/148 |
| 6,907,049 B1 | * | 6/2005 | Tamura | 370/479 |
| 6,985,727 B2 | * | 1/2006 | Janardhanan | 455/434 |

* cited by examiner

*Primary Examiner*—Tilahun Gesesse
(74) *Attorney, Agent, or Firm*—Harrington & Smith, PC

(57) ABSTRACT

A method is disclosed to operate a spread spectrum receiver with an active set of base stations. The method includes monitoring a current serving base station of the active set with a Set Searcher and simultaneously monitoring individual ones of remaining base stations of the active set with a C/I (carrier-to-interference ratio) Searcher. One of the remaining base stations is designated as a Candidate base station for potentially replacing the current serving base station and is monitored continuously by a first set of fingers of the C/I Searcher. The other remaining ones of the base stations of the active set are monitored in a time multiplexed manner by a second set of fingers of the C/I Searcher. The method further includes detecting that one of the remaining ones of the base stations of the active set is received with a stronger signal than the Candidate base station, and designating the detected one of the base stations as a new Candidate base station, and beginning the continuous monitoring of the new Candidate base station while monitoring the other remaining ones of the base stations of the active set, including the previous Candidate base station, in the time multiplexed manner. A spread spectrum receiver that operates in accordance with the method is also disclosed.

27 Claims, 2 Drawing Sheets

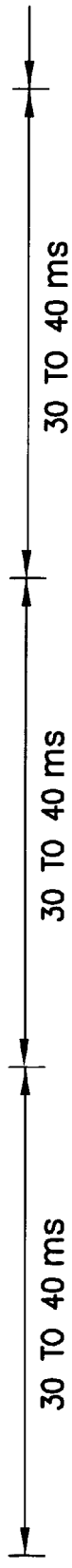

APPARATUS AND METHOD EMPLOYING TIME-MULTIPLEXED SEARCHER FINGER MONITORING FOR ACTIVE SET AND OTHER BASE STATIONS

TECHNICAL FIELD

This invention relates generally to spread spectrum receivers and, more specifically, relates to cell selection and packet data call handoff in the 1xEV-DV spread spectrum communications system.

BACKGROUND

In the 1xEV-DV system, also sometimes referred to as cdma2000, Release C or Release D, a packet data call does not use the conventional soft handoff process for the forward (base station to mobile station) packet data control channel/ packet data channel (F-PDCCH/PDCH), but uses cell selection instead. The reverse (mobile station to base station) Quality Channel Indicator Channel (R-CQICH) is used to report the pilot channel carrier to interference ratio (C/I) information for the current serving sector (currently serving base station), and to indicate cell switching. In order to perform cell selection, the mobile station is required to make C/I measurements of the base stations in its Active Set and to determine whether a change of the serving base station is needed. If a change of serving base stations is needed, the mobile station initiates the base station switching procedure by applying the Walsh cover of the target base station to the C/I measurement and transmitting a distinctive switching pattern on the R-CQICH channel.

In a cellular communications system of interest to this invention the Active Set may contain up to six base stations, and it is possible that all six base stations support packet data service, such as enhanced packet data service, also known as 1xEV-DV. In a case where the mobile station includes six fingers, i.e., six PN (pseudonoise) decorrelators or demodulators, at least two of the fingers may be assigned to multi-paths of the same base station. When a plurality of the fingers are assigned to the same, serving base station, it may become difficult to reliably measure with the remaining finger hardware the C/I of all non-serving base stations in the packet data channel Active Set.

More specifically, since typically two to three multi-paths are observed in the radio channel (per base station), 10 to 15 demodulation elements could be required in order to continuously measure the C/I of five non-serving active base stations. As can be appreciated, this would represent a large amount of complexity in order to implement the C/I measurement function, as compared to the hardware needed to just demodulate the traffic data.

When performing a set maintenance procedure, a conventional function of the mobile station continuously measures the Pilot channels of the Active and Neighbor sets. However, for cell selection the mobile station should measure the average C/I of all base stations in its packet data channel Active Set in order to select the best base station.

It would thus be beneficial to provide a mobile station having reduced hardware complexity, and a means to control the hardware to provide the required C/I measurements for cell selection and 1xEV-DV cell maintenance.

SUMMARY OF THE PREFERRED EMBODIMENTS

The foregoing and other problems are overcome, and other advantages are realized, in accordance with the presently preferred embodiments of these teachings.

This invention describes a circuit and a method for measuring the active set C/I for cell selection. Continuous monitoring of all the base stations in the active set requires special procedures and control to use the C/I measurement hardware. The non-serving active sectors are preferably monitored through a combination of round robin and prioritized approaches.

In one aspect, this invention provides a method to operate a spread spectrum receiver with an active set of base stations, and includes monitoring a current serving base station of the active set with a Set Searcher and simultaneously monitoring individual ones of remaining base stations of the active set with a C/I Searcher, where one of the remaining base stations is designated as a Candidate base station for potentially replacing the current serving base station and is monitored continuously by a first set of fingers of the C/I Searcher, and where the other remaining ones of the base stations of the active set are monitored in a time multiplexed manner by a second set of fingers of the C/I Searcher. The method further includes detecting that one of the remaining ones of the base stations of the active set is received with a stronger signal than the Candidate base station, and designating the detected one of the base stations as a new Candidate base station, and beginning the continuous monitoring of the new Candidate base station while monitoring the other remaining ones of the base stations of the active set, including the previous Candidate base station, in the time multiplexed manner.

In another aspect, this invention provides a spread spectrum receiver operable with an active set of base stations. The receiver includes a first bank of demodulators that form a Set Searcher for monitoring a current serving base station of the active set, and further includes a second bank of demodulators that form a C/I Searcher for simultaneously monitoring individual ones of remaining base stations of the active set, where one of the remaining base stations is designated as a Candidate base station for potentially replacing the current serving base station and is monitored continuously by a first set of fingers, and where the other remaining ones of the base stations of the active set are monitored in a time multiplexed manner by a second set of fingers.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2 shows an Active/Candidate/Neighbor base station search pattern executed by the searcher of FIG. 1 during the Traffic state; and FIG. 3 illustrates a C/I searcher finger management procedure in accordance with this invention.

DETAILED DESCRIPTION OF THE PREFERRED EMBODIMENTS

Figure 1:
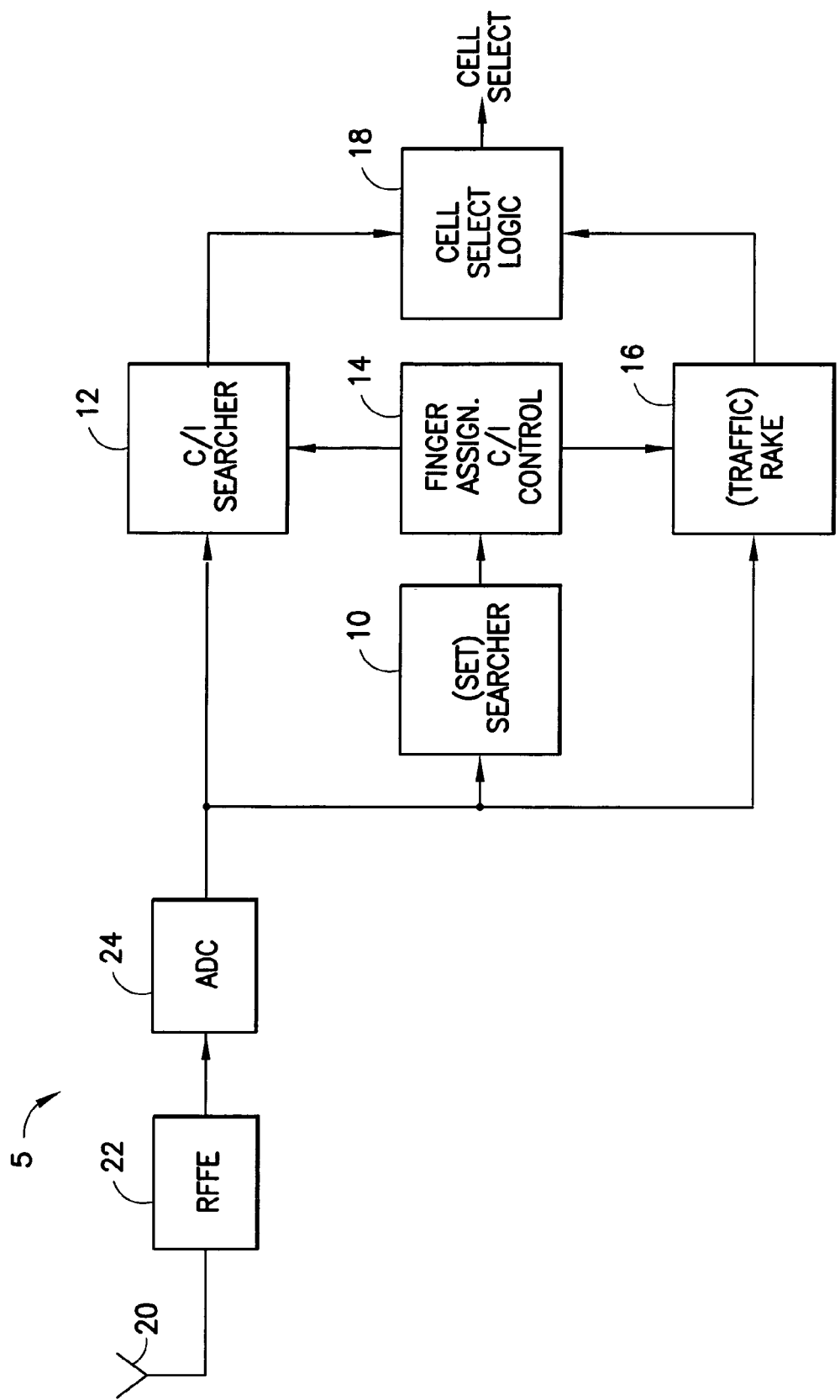
FIG. 1 is a simplified block diagram of a CDMA receiver that is suitable for practicing this invention.

FIG. 1 shows a portion of a mobile station 5, specifically a Set Searcher 10 and a C/I (signal to noise plus interference ratio) Searcher 12 having a plurality of (e.g., six) pilot channel demodulating elements, also referred to herein collectively as C/I fingers 12. The C/I Searcher 12 may be considered to comprise a bank of demodulators, where the bank of demodulators comprises the fingers 12. A finger assignment, C/I control logic block 14 is responsible for the overall management and control of the C/I Searcher 12 as well as a conventional RAKE 16, that demodulates a traffic channel (e.g., the PDCH). The C/I Searcher 12 preferably demodulates only pilot channels, and its output is further processed by a cell selection logic block 18 for making cell selection decisions. In this embodiment the C/I Searcher 12 has six fingers, it is thus capable of measuring the C/I of at least two base stations in the Active Set simultaneously, assuming a 3-path radio channel. The Set Searcher 10 may also be considered to comprise a bank of demodulators. The fingers of the Set Searcher 10 are used for demodulating pilot channels of base stations in the Active Set, as defined by base station set maintenance data that is received by the mobile station 5.

The construction and use of fingers in a spread spectrum receiver, such as a RAKE-type of receiver, is well known. For example, reference can be made to the following two U.S. Patents: U.S. Pat. No. 6,269,075 B1, "Finger Assignment in a CDMA RAKE Receiver", by Jean-Marie Tran, and U.S. Pat. No. 6,570,909 B1, "Interference Suppression in a CDMA Receiver", by Antti Kansakoski and Jean-Marie Tran, both of which U.S. Patents show and describe multi-finger RAKE receiver architectures.

In order to avoid subsequent confusion it should be noted that the base stations of the Candidate set operated on by the Set Searcher 10 (see FIG. 2) are not the same as the Candidate base station operated on by the C/I Searcher 12 (see FIG. 3). The Candidate base stations in FIG. 2 are by definition not in the Active set, while the Candidate base station in FIG. 3 is, by definition in accordance with this invention, a member of the Active set of base stations.

Depending on the number of base stations in the packet data channel Active set, the fingers of the C/I Searcher 12 are controlled so as to be time shared for measuring the C/I of the non-serving base stations. The C/I measured on the non-serving base stations is compared by the cell selection logic 18 to the C/I measured by the separate demodulating elements of the RAKE 16, that are assigned to the serving base station, that process the F-PDCH/F-PDCCH in 1×EV-DV. This comparison aids the cell selection logic function 18 in making cell selection decisions. If a non-serving base station in the Active Set has a greater C/I value than that of the serving base station, the mobile station 5 initiates a switch from one to the other.

The C/I Searcher 12 may use a delay lock loop (DLL) for time tracking individual base station multi-paths.

Shown for completeness in FIG. 1 is also an RF antenna 20, a radio frequency front end (RFFE) 22, and an analog to digital converter (ADC) 24 for converting the received spread spectrum signal to baseband (BB).

When the packet data channel Active Set has three or less base stations, no special control is needed since the C/I Searcher 12 allows continuous monitoring of the two non-serving base stations (with three fingers allocated to each of the two non-serving base stations for three different multi-paths). However, if there are more than three members of the Active set, then in accordance with an aspect of this invention the C/I Searcher 12 is controlled or scheduled by the control logic 14 in accordance with one of a plurality of different techniques.

The first scheduling technique is a round robin technique, where the control logic 14 schedules two Pilot channels to the C/I Searcher fingers 12 at one time, and alternatively switches between them to estimate the Pilot channel C/I.

The second technique can be referred to as Candidate set scheduling, where the non-serving base station with the strongest C/I amongst the non-serving base stations in the Active Set is continuously monitored by three of the C/I searcher fingers 12, and the remaining three fingers are scheduled so as to monitor the active non-serving base stations in the time-shared, round robin fashion. In this approach, and assuming the C/I Searcher 12 hardware constraints given above, the C/I Candidate set is preferably limited to one member. FIG. 3, discussed below, shows this procedure.

The third technique is referred to as searcher-based scheduling, where the Pilot Ec/Io is used to modify the round robin scheduling to search more frequently for the non-serving base station having the largest Pilot Ec/Io. In an alternate embodiment, the Pilot Ec/Io is used to determine the one Candidate set member for the C/I Searcher 12, as per the second technique.

The presently preferred embodiment is the second technique referred to above, since the concept of the Candidate set can be readily implemented, as can the variable Active Set sizes (i.e., the number of non-serving base stations in the Active Set). In this technique, and apart from the serving sector base station that is monitored by the Set Searcher 10, the C/I Searcher 12 continuously monitors the non-serving base station with the strongest C/I, hence measuring in the same way as the serving sector C/I measurement is performed. This permits comparing the measured C/I every slot (i.e., every 1.25 ms).

Note that the round robin scheduling rate of the remaining non-serving base stations may be slower than that of the C/I Candidate because of the assignment and lock time overheads. Each non-serving base station may be monitored for several 20 ms frames, e.g., for 100 ms. The derived C/I measurement performed every slot is filtered and, at the end of the allocated time, the filtered non-candidate/non-serving C/I is compared with the Candidate C/I filtered data to determine if the Candidate base station should be replaced (i.e., to determine if the C/I of the non-candidate/non-serving base station is greater than the C/I of the Candidate base station). The results of this comparison are also shown in FIG. 3, where first base station A3, and then base station A6, become the new Candidate base station.

Preferably, once every Power Control Group (PCG), or 1.25 ms, the filtered C/I data of the serving sector base station is compared with the filtered C/I data of the Candidate base station (obtained from the C/I Searcher 12) in order to determine whether a change of the serving base station is required. The comparison can be performed at least in part by the cell selection logic 18.

In a presently preferred embodiment of this invention the C/I Searcher 12 is physically separate from the normal Set Searcher 10, and from the RAKE 16, but the C/I Searcher 12 finger management function (C/I control logic 14) is preferably part of an overall finger management and assignment process that includes both the Set Searcher 10, the RAKE 16 and the C/I Searcher 12. However, in other embodiments the functionality of the Set Searcher 10 and the C/I Searcher 12 could be merged into one Searcher.

As is shown in FIG. 2, during a traffic call the Set Searcher 10 periodically monitors the active/candidate/neighbor (A/C/N) base stations every 30 ms to 40 ms. The profile output for the Active Set members is compared after every search with the current assigned hardware fingers, and decisions are made whether to assign/de-assign fingers with these new multi-paths. The profiles after each search need not be stored, and may be over-written to conserve memory. Hence, it is preferred that the C/I control logic 14 form a part of the normal finger assignment process, and that it can be exercised every 100 ms to schedule packet data channel Active Set members in the round robin basis.

More specifically, FIG. 2 shows an example of the search pattern executed by the Set Searcher 10 when operating in the traffic state. After every search of an Active Set base station, the profile obtained from the Set Searcher 10 for that particular base station is compared with the current finger positions to determine if any should be replaced/added. An update_finger_profile structure is updated after every Active Set PN search. After all of the Active Set base stations are searched, an assign_finger_profile is executed to program the hardware fingers of the Set Searcher 10 based on the status of the update_finger_profile structure.

It is presently preferred that the fingers of the C/I Searcher 12 employ a similar structure to the update_finger_profile structure to assign/re-assign Candidate and remaining base stations of the packet data channel Active Set.

A2–A6). As such, between $T_0$ and $T_1$ C=A4, and A4 happens to be assigned to fingers 1–3 of the C/I Searcher 12 (for tracking three multi-paths). At point $T_1$ in FIG. 3 it is found that base station A3 is stronger than the current candidate (C) base station A4, and hence base station A3 is assigned as the new candidate base station. Since A3 was assigned to fingers 4–6 of the C/I Searcher 12 just prior to $T_1$, it remains assigned to these fingers, and thus fingers 4–6 are now used for continuously monitoring the new Candidate base station A3, while fingers 1–3 are now time multiplexed amongst the remaining base stations A2, A4, A5 and A6. Similarly, at point $T_2$ in FIG. 3 it is assumed that base station A6 is found to be stronger than the current Candidate base station A3, and hence A6 is assigned as the new candidate base station. Since base station A6 was assigned to fingers 1–3 just prior to $T_2$, it remains assigned to these fingers, and fingers 1–3 are now used for continuously monitoring the new Candidate base station A6, while fingers 4–6 are time multiplexed amongst the remaining base stations A2, A3, A4 and A5. The illustrated monitoring times for each of the base stations A2–A6 shown in FIG. 3 may be about 100 ms, as was explained above.

What follows now is an example of pseudocode for implementing the finger management functions of the C/I control logic 14, in accordance with the foregoing discussion:

After each Active set base station search:

Update finger profile for the normal fingers;

```
If(PDCH_reduced_active_set <=3){ /* case where PDCH reduced Active set has 3 or
                                    less than 3 Base stations */
    if( Ai != serving_sector){
        Update finger profile for the C/I Searcher fingers (12);
        if(Candidate_base_station needs to be replaced){
            Assign current remaining BS as the Candidate BS;
            Re-assign candidate BS as the current remaining BS;
        }
    }
}
else {    /* case where PDCH reduced Active set has more than 3 BS */
    if( Ai != serving_sector){
        Update finger profile for the C/I Searcher fingers (12);
        if(timer expired){
          if(Candidate_base_station needs to be replaced){
                Assign current remaining BS as the Candidate BS;
                Re-assign candidate BS fingers to the
                next remaining BS ie.update Searcher C/I finger profile;
            }
            else{
                Re-assign current remaining BS fingers to the
                next remaining BS ie.update Searcher C/I finger profile;
            }
          Restart timer;
        }
    }
}
```

FIG. 3 shows an example of an embodiment of C/I Searcher 12 finger management procedure that is implemented by the C/I Searcher control logic 14, and thus maybe seen to also represent an illustration of the method in accordance with this invention. Assume in this case that the packet data channel Active Set contains six base stations: A1, A2, A3, A4, A5 and A6. The current serving sector is assumed to be A1, and is thus assumed to be tracked by the fingers of the RAKE 16 (and hence A1 does not currently appear in the C/I Searcher 12). Further, assume at time $T_0$ that A4 is the Candidate base station (i.e., the base station having the greatest C/I of the remaining five base stations The foregoing procedure for managing the C/I Searcher 12 fingers can be seen to be relatively simple, and is based on the concept of the Candidate set. The round robin time may be initially set at 100 ms, or some other desired value, and then subsequently modified, if needed, based on field use experience.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but a few examples, the searchers 10 and 12 can use more or less than six fingers and, if more than six fingers were used, the C/I Searcher 12 could monitor more than one candidate (C) base station. However, all such and similar modifications of the teachings of this invention will still fall within the scope of this invention.

As was noted above, it is within the scope of this invention to provide only the Set Searcher 10, and to combine, for example, the functionality of the C/I Searcher 12 with the Set Searcher 10 in a time-shared manner.

Further, some of the features of the present invention could be used to advantage without the corresponding use of other features. As such, the foregoing description should be considered as merely illustrative of the principles of the present invention, and not in limitation thereof.

What is claimed is:

1. A method to operate a spread spectrum receiver with an active set of base stations, comprising:
    monitoring a current serving base station of the active set with a first set of fingers; and
    simultaneously monitoring individual ones of remaining base stations of the active set, where one of the remaining base stations is designated as a Candidate base station for potentially replacing the current serving base station and is monitored continuously by a second set of fingers, and where the other remaining ones of the base stations of the active set are monitored in a time multiplexed manner by a third set of fingers.

2. A method as in claim 1, further comprising:
    detecting that one of the remaining ones of the base stations of the active set is received with a stronger signal than the Candidate base station; and
    designating the detected one of the base stations as a new Candidate base station, and beginning the continuous monitoring of the new Candidate base station while monitoring the other remaining ones of the base stations of the active set, including the previous Candidate base station, in the time multiplexed manner.

3. A method as in claim 1, where individual ones of the other remaining ones of the base stations of the active set are monitored for a predetermined period of time.

4. A method as in claim 3, where the predetermined period of time is about 100 ms.

5. A method as in claim 1, where only a Pilot channel of the individual ones of remaining base stations of the active set are monitored.

6. A method as in claim 1, where only the Pilot channel of the individual ones of remaining base stations of the active set are demodulated for the Candidate base station and for a currently selected one of the other remaining ones of the base stations of the active set.

7. A method as in claim 1, where the second set of fingers is used to obtain an average carrier to interference ratio of the remaining base stations of the active set for use in making a cell selection decision.

8. A method as in claim 1, where the second set of fingers is used to obtain an average carrier to interference ratio of the remaining base stations of the active set for use when identifying a target cell during a packet data call.

9. A spread spectrum receiver operable with an active set of base stations, comprising:
    a first bank of demodulators comprising a Set Searcher for monitoring a current serving base station of the active set; and
    a second bank of demodulators comprising a C/I Searcher for simultaneously monitoring individual ones of remaining base stations of the active set, where one of the remaining base stations is designated as a Candidate base station for potentially replacing the current serving base station and is monitored continuously by a first set of fingers of the C/I Searcher, and where the other remaining ones of the base stations of the active set are monitored in a time multiplexed manner by a second set of fingers of the C/I Searcher.

10. A spread spectrum receiver as in claim 9, further comprising circuitry for detecting that one of the remaining ones of the base stations of the active set is received with a stronger signal than the Candidate base station and for designating the detected one of the base stations as a new Candidate base station so as to begin the continuous monitoring of the new Candidate base station while monitoring the other remaining ones of the base stations of the active set, including the previous Candidate base station, in the time multiplexed manner.

11. A spread spectrum receiver as in claim 9, where individual ones of the other remaining ones of the base stations of the active set are monitored for a predetermined period of time.

12. A spread spectrum receiver as in claim 9, where the C/I Searcher demodulates only a Pilot channel of the individual ones of remaining base stations of the active set.

13. A spread spectrum receiver as in claim 9, where the C/I Searcher demodulates only the Pilot channel of the individual ones of remaining base stations of the active set using a plurality of fingers for demodulating the Candidate base station and another plurality of fingers for demodulating a currently selected one of the other remaining ones of the base stations of the active set.

14. A spread spectrum receiver as in claim 9, where the C/I Searcher demodulates only the Pilot channel of the individual ones of remaining base stations of the active set using a plurality of fingers for demodulating multi-paths of the Candidate base station and another plurality of fingers for demodulating multi-paths of a currently selected one of the other remaining ones of the base stations of the active set.

15. A spread spectrum receiver as in claim 9, where the C/I Searcher is used to obtain an average carrier to interference ratio of the remaining base stations of the active set for use in making a cell selection decision.

16. A spread spectrum receiver as in claim 9, where the C/I Searcher is used to obtain an average carrier to interference ratio of the remaining base stations of the active set for use when identifying a target cell during a packet data call.

17. A method to operate a mobile station that is compatible with a 1×EV-DV spread spectrum protocol, comprising:
    during a packet data call, monitoring a current serving base station of an active set of base stations with a Set Searcher;
    simultaneously monitoring individual ones of remaining base stations of the active set with a C/I Searcher, where one of the remaining base stations is designated as a Candidate base station for potentially replacing the current serving base station and is monitored continuously by a first set of fingers of the C/I Searcher, and where the other remaining ones of the base stations of the active set are monitored in a time multiplexed manner by a second set of fingers of the C/I Searcher; and in response to detecting that one of the remaining ones of the base stations of the active set is received with a stronger signal than the Candidate base station, designating the detected one of the base stations as a new Candidate base station, and beginning the continuous monitoring of the new Candidate base station while monitoring the other remaining ones of the base stations of the active set, including the previous Candidate base station, in the time multiplexed manner.

18. A method as in claim 17, where the C/I Searcher is operated to obtain an average carrier to interference ratio of the remaining base stations of the active set for use during a target cell selection procedure during the packet data call.

19. A method as in claim 17, where the C/I Searcher uses a delay lock loop (DLL) for time tracking individual base station multi-paths.

20. Program code embodied in a tangible medium execution of which operates a radio frequency receiver, comprising operations of:
  monitoring a current serving base station of an active set with a first set of fingers; and
  simultaneously monitoring individual ones of remaining base stations of the active set, where one of the remaining base stations is designated as a Candidate base station for potentially replacing the current serving base station and is monitored continuously by a second set of fingers, and where the other remaining ones of the base stations of the active set are monitored in a time multiplexed manner by a third set of fingers.

21. Program code as in claim 20, further comprising operations of:
  detecting that one of the remaining ones of the base stations of the active set is received with a stronger signal than the Candidate base station; and
  designating the detected one of the base stations as a new Candidate base station, and beginning the continuous monitoring of the new Candidate base station while monitoring the other remaining ones of the base stations of the active set, including the previous Candidate base station, in the time multiplexed manner.

22. Program code as in claim 20, where individual ones of the other remaining ones of the base stations of the active set are monitored for a predetermined period of time.

23. Program code as in claim 22, where the predetermined period of time is about 100 ms.

24. Program code as in claim 20, where only a Pilot channel of the individual ones of remaining base stations of the active set is monitored.

25. Program code as in claim 20, where only the Pilot channel of the individual ones of remaining base stations of the active set is demodulated for the Candidate base station and for a currently selected one of the other remaining ones of the base stations of the active set.

26. Program code as in claim 20, where the second set of fingers is used to obtain an average carrier to interference ratio of the remaining base stations of the active set for use in making a cell selection decision.

27. Program code as in claim 20, where the second set of fingers is used to obtain an average carrier to interference ratio of the remaining base stations of the active set for use when identifying a target cell during a packet data call.

\* \* \* \* \*